United States Patent [19]

Burke

[11] Patent Number: 5,301,437
[45] Date of Patent: Apr. 12, 1994

[54] UTILITY BOX INSERT

[76] Inventor: Lynn Burke, 6 Jefferson Ave., Takoma Park, Md. 20912

[21] Appl. No.: 890,127

[22] Filed: May 29, 1992

[51] Int. Cl.[5] ............... H02G 3/02; B25H 7/04; G01B 3/14
[52] U.S. Cl. .................... 33/562; 33/528; 33/DIG. 10
[58] Field of Search ......... 33/562, 194, 528, DIG. 10; 220/3.2, 3.3, 3.5, 3.8, 3.94; 174/67, 101

[56] References Cited

U.S. PATENT DOCUMENTS

| | | | |
|---|---|---|---|
| 2,788,151 | 4/1957 | Shore | 33/562 |
| 2,887,776 | 5/1959 | Eisner | 33/528 |
| 3,601,276 | 8/1971 | Culpepper | 220/3.8 |
| 3,745,664 | 7/1973 | Altseimer | 33/528 |
| 3,940,857 | 3/1976 | Giordano | 33/528 |
| 4,359,302 | 11/1982 | Payne | 33/DIG. 10 |
| 4,384,396 | 5/1983 | Smolik | 33/DIG. 10 |
| 4,438,859 | 3/1984 | Solek | 220/3.2 |
| 4,541,538 | 9/1985 | Swetnam | 220/3.2 |
| 4,605,139 | 8/1986 | Dacar | 33/DIG. 10 |
| 4,685,581 | 8/1987 | Kaneda et al. | 220/3.3 |
| 4,892,212 | 1/1990 | Andreyko | 220/3.3 |
| 4,907,711 | 3/1990 | Stuchlik | 220/3.8 |
| 4,953,733 | 9/1990 | Loscuito | 33/528 |

Primary Examiner—William A. Cuchlinski, Jr.
Assistant Examiner—C. W. Fulton
Attorney, Agent, or Firm—Aquilino & Welsh

[57] ABSTRACT

A utility box insert for protecting the contents of the utility box during the installation of wallboard. The insert includes a base plate dimensioned to fit within the interior of a utility box, sidewalls extending upwardly from the sides of the plate, fastening tabs extending upwardly from the ends of the plate in order to hook over the edge of the utility box, and cut-outs cooperating with said fastening tabs in order to accommodate for mounting ears located on the utility box.

19 Claims, 2 Drawing Sheets

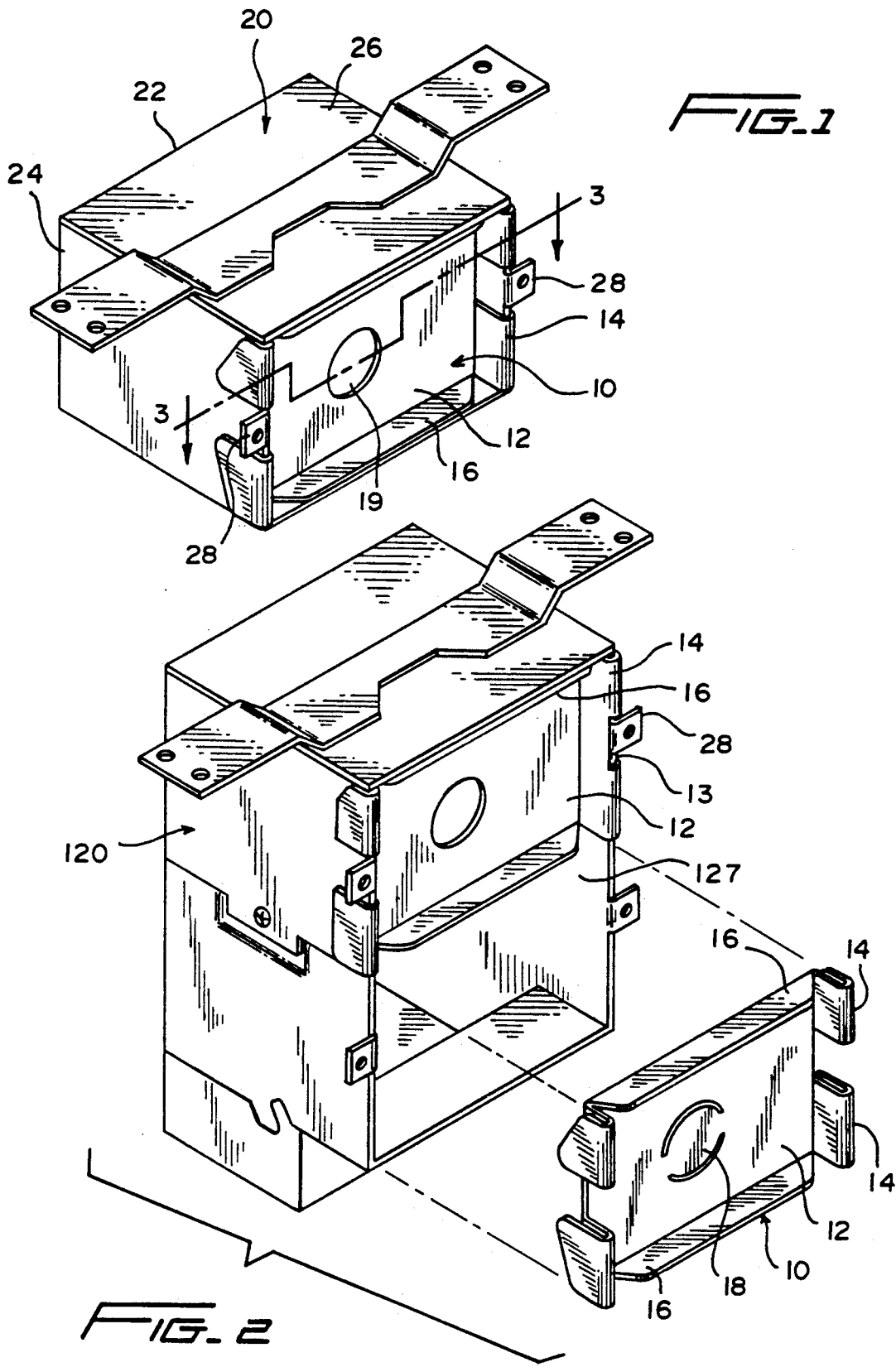

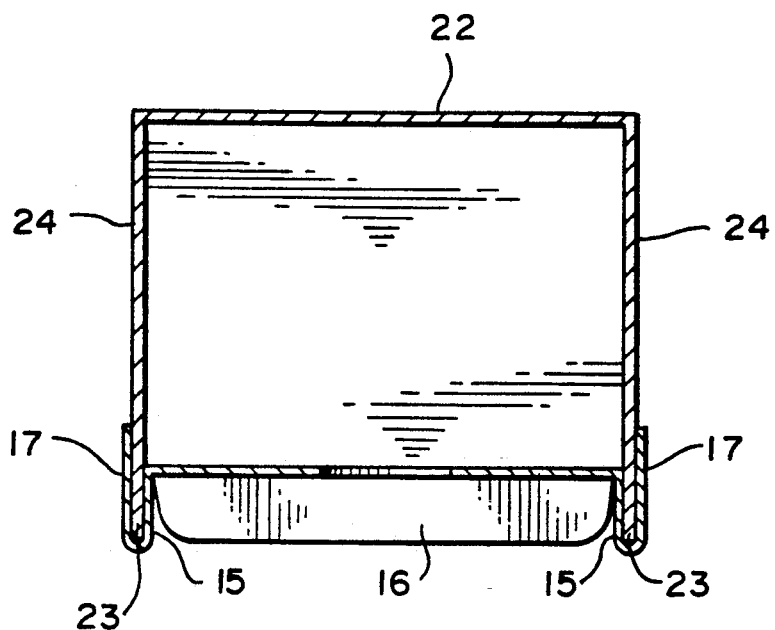
FIG_3
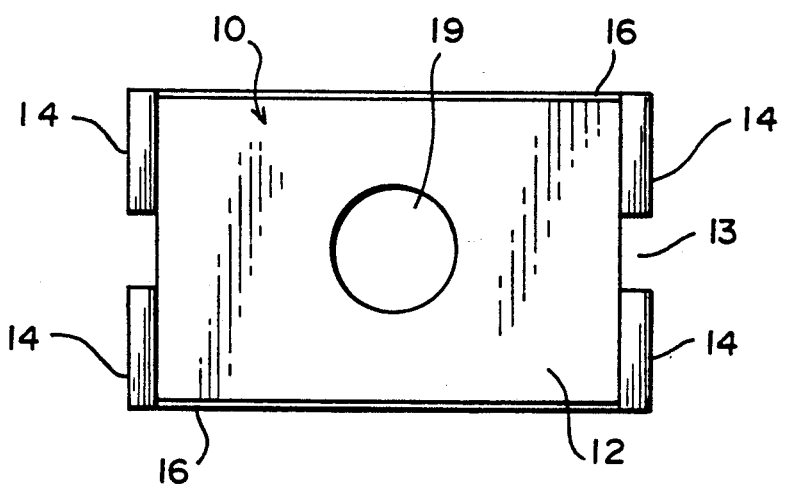
FIG_4
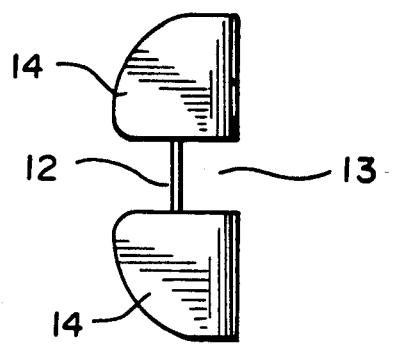
FIG_5

UTILITY BOX INSERT

BACKGROUND OF THE INVENTION

The present invention relates to utility boxes, and more particularly, inserts for utility boxes to prevent the contents of the utility boxes from becoming damaged by a cutting tool during installation of wallboards. The insert of the present invention also functions as a template to guide a cutting tool around the interior perimeter of a utility box while not allowing the cutting tool to come in contact with the contents of the utility box.

It has become common practice in the construction industry to cut openings in wallboards, after the wallboards have been installed to the studs, in order to gain access to the utility boxes, such as electrical, telephone, television and the like, previously installed therebehind.

Therefore, a need has developed in the industry for a device which cooperates with the utility box to protect the box and its contents from the cutting tool used to gain access to the utility box. There have been attempts made in the prior art to fulfill the need for such a device, as witnessed by the U.S. Pat. Nos. to Smolik (4,384,396) and Payne (4,359,302). However, these devices have not gained acceptance, as they are too costly to manufacture as they require grooves to be made in the plate, or are too difficult to use, as they are not easily attachable to the utility box.

The present invention is intended to solve the above shortcomings by providing a device which is easy to use and inexpensive to manufacture because it simply snaps on to the edge of the box and can be disposed of after use.

SUMMARY OF THE INVENTION

The present invention is an insert for a utility box to protect the box and its contents from a cutting tool upon the installation of wallboard. The insert includes a plate having ends and sides which are dimensioned slightly smaller than the interior periphery formed by the endwalls and sidewalls of the utility box. The plate includes generally U-shaped fastening tabs extending upwardly from each end of the plate in order to hook over the edge of the endwalls of the utility box and sidewalls extending upwardly from the sides of the plate. The fastening tabs and the sidewalls cooperate together to form a template about which a cutting tool can travel.

It is an object of the invention to provide an insert for protecting a utility box and any wires within from a cutting tool during the installation of wallboards.

It is another object of the invention to provide an insert which will function as a template in order to guide a cutting tool.

It is still another object of the invention to provide a simple, one-piece insert which can be easily installed and disposed of after use.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 shows a perspective view of the present invention mounted in a utility box.

FIG. 2 shows a perspective view of a two-gang utility box in cooperation with two separate inserts of the present invention, one insert secured in one gang thereof and the other insert shown in an exploded view.

FIG. 3 shows a sectional view taken along line 3—3 in FIG.

FIG. 4 shows a top view of the present invention.

FIG. 5 shows an end view of the present invention.

DESCRIPTION OF THE PREFERRED EMBODIMENTS

The detailed embodiments of the present invention are disclosed herein, however, it is to be understood that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Referring to FIGS. 1 and 2, the utility box insert 10 of the present invention can best be understood. As shown, the insert 10 is made from a single sheet of metal. The sheet metal is stamped with a predetermined die pattern and then bent into the appropriate configuration in order to cooperate with a metal or plastic utility box.

Generally, the insert 10 includes a base plate 12, fastening tabs 14, sidewalls 16 and an optional knock-out hole 18. The plate 12 is dimensioned to fit within a utility box 20. The utility box 20 includes a bottom 22 with end walls 24 and sidewalls 26 extending therefrom in order to form an open ended box. The utility box 20 further includes mounting ears 28, which may extend inwardly or outwardly of the end walls 24 of the box.

The exact dimension of plate 12 depends on the utility box within which the insert is to be located. In the preferred embodiment of FIG. 1, the plate 12 has an outer periphery which is slightly less than the inner periphery formed by the end walls 24 and sidewalls 26 of the utility box 20.

As shown in FIG. 2, the insert 10 includes a base plate 12 which is only dimensioned to fit within one gang 115 of a two-gang box 120. Thus, another insert 10 is required in order to cover the open end 127 of a second gang 117 of utility box 120. However, it is contemplated that a multiple gang insert could be made by simply increasing the dimensions of the base plate to correspond to the dimensions of the multiple gang box.

The plate 12 is shown with an optional knock-out hole 18 which allows insert 10 to be removed from a utility box by a finger when inserted therein. Sidewalls 16 extend from the sides of base plate 12 and can be resilient, which allows them to frictionally engage the interior sidewalls 26 of the utility box 20 to aid in securing the insert 10 within the utility box. In the multiple gang utility box 120, as shown in FIG. 2, individual inserts are used for each gang, and one sidewall of each insert will engage a corresponding sidewall of the other insert.

Referring to FIGS. 3, 4 and 5, the fastening tabs 14 of the present invention will be described. Fastening tabs 14 extend from the end of base plate 12 and are generally U-shaped, as seen by the cross section in FIG. 3. The fastening tabs 14 include an inner wall 15 and an outer wall 17. In the preferred embodiment, the outer wall 17 is longer than the inner wall 15, but outer wall 17 only needs to be of a length sufficient to grasp the edge 23 of end wall 24. The walls of fastening tab 14 can be resilient in order to better grasp edge 23. Fastening tabs 14 fit over the edge 23 of end walls 24 and include a mounting ear accommodation means 13. As shown in FIGS. 4 and 5, the mounting ear accommodation means 13 is in the form of an opening between a pair of fastening tabs 14. As shown in FIG. 2, the mounting ear accommodation means 13 is in the form of a cut-out on a fastening tab 14 Thus, the mounting ear accommodation opening can be of various shapes and designs in order to cooperate with any form of mounting ear.

In operation, an insert 10 would be secured to a utility box after the wires have been run to the box, but before the wallboard has been installed to the studs. The wallboard is then installed over the utility box and insert combination. The installer, after locating the position of the utility box behind the wallboard, gains access to the utility box by cutting a hole with a rotary cutting tool until he contacts base plate 12. The tool is then displaced along the base plate until it contacts either a sidewall 16 or inner wall 15 of a fastening tab 14. Since the fastening tabs 14 and the sidewall 16 cooperate to form a template, the cutting tool can then be manually moved around the sidewalls 16 and inner walls 15, cutting an accurately sized opening. As the cutting tool travels around the template, it is not able to enter the box any further than base plate 12 and thus cannot damage any wires within the box. Further, the sidewalls 16 and fastening tabs 14 protect the inner periphery of the utility box from coming in contact with the cutting tool and thereby protect the utility box from any damage. If the opening is not large enough that the insert 10 can be removed, the cutting tool can then be inserted to contact and cut around the outer periphery of the utility box, starting and stopping on both sides of the mounting ears 28. The knock-out 18 is then removed, leaving a hole 19 into which a finger can be placed to pull off the base plate 12 and remove the insert from the utility box.

To attach the insert 10, a user simply aligns the mounting ear accommodation means 13 with the mounting ears 28 and then pushes the insert until the fastening tabs 14 have securely grasped the edge 23 of the endwalls 24.

While various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A utility box insert for protecting the contents of a utility box during the installation of wallboard, comprising:
   a plate dimensioned to fit within the interior of the utility box having opposed sides and ends;
   a fastening tab at each end of said plate extending upwardly from said plate to hook over edges of the end walls of the utility box; and,
   mounting ear accommodation means cooperating with said fastening tabs to align the insert and allow the insert to be secured within a utility box with mounting ears.

2. The invention of claim 1 further including sidewalls extending upwardly from the sides of said plate; the sidewalls cooperate with said fastening tabs to form a template about which a cutting tool can travel to avoid contact with the utility box.

3. The invention of claim 2 wherein said plate, said fastening tabs and said sidewalls are integrally formed from a single sheet of material.

4. The invention of claim 2 wherein said sidewalls and said fastening tabs are resilient to frictionally fit within interior sides and ends of the utility box.

5. The invention of claim 1 wherein said fastening tabs are generally U-shaped and frictionally engage the edges of the ends of the utility box.

6. The invention of claim 1 wherein said plate includes a knock-out hole located therein.

7. The invention of claim 1 wherein said mounting ear accommodation means is in the form of an opening between a pair of fastening tabs at each end of said plate.

8. The invention of claim 1, wherein said mounting ear accommodation means is in the form of a cut-out in said fastening tabs.

9. The invention of claim 1, wherein said insert is formed from a single sheet of metal with said fastening tabs bent generally perpendicular to said plate ends and side walls bent upward generally perpendicular to said plate sides.

10. A utility box insert in combination with a utility box wherein said utility box comprises:
    a box having sidewalls, endwalls including mounting ears, and a bottom; and
    wherein said insert comprises:
    a plate dimensioned to fit within the interior of said utility box having opposed sides and ends and flexible side walls extending upwardly from the sides of said plate; and, 11. The invention of claim 10 further including mounting ear accommodation means which cooperate with said fastening tabs to align the insert to accommodate for the mounting ears in the endwalls of said utility box.

12. The invention of claim wherein said mounting ear accommodation means is in the form of a cut-out in said fastening tabs.

13. The invention of claim wherein said mounting ear accommodation means is in the form of an opening between a pair of fastening tabs at each end of said plate.

14. The invention of claim 10 wherein said utility box is a plural gang box and the number of inserts equals the number of gangs.

15. The invention of claim 10 further including sidewalls extending upwardly from the sides of said plate, the sidewalls cooperating with said fastening tabs to form a template about which a cutting tool can travel around to avoid contact with the utility box.

16. The invention of claim 10 wherein said fastening tabs are generally U-shaped and frictionally engage the edges of the ends of the utility box.

17. The invention of claim 10 wherein said plate includes a knock-out hole located therein.

18. The invention of claim 10 wherein said plate, said fastening tabs and said sidewalls are integrally formed from a single sheet of material.

19. The invention of claim 10, wherein said insert is formed from a single sheet of metal with said fastening tabs bent generally perpendicular to said plate ends and side walls bent upward generally perpendicular to said plate sides.

* * * * *